(12) United States Patent
Black

(10) Patent No.: US 7,376,205 B1
(45) Date of Patent: May 20, 2008

(54) DEVICE AND METHOD FOR COMPENSATION OF TRANSMISSION LINE DISTORTION

(75) Inventor: William C. Black, Ames, IA (US)

(73) Assignee: Xilinx, Inc., San Jose, CA (US)

( * ) Notice: Subject to any disclaimer, the term of this patent is extended or adjusted under 35 U.S.C. 154(b) by 1183 days.

(21) Appl. No.: 09/989,937

(22) Filed: Nov. 20, 2001

(51) Int. Cl.
  *H04L 25/03* (2006.01)
  *H04L 25/06* (2006.01)
  *H04L 25/10* (2006.01)
  *H04L 27/08* (2006.01)

(52) U.S. Cl. .................. 375/318; 375/297; 375/345; 375/344

(58) Field of Classification Search ........... 375/296, 375/258, 254, 344–345, 317–319, 311–312; 330/149, 165, 117, 53, 252, 254, 256, 259, 330/278, 289, 290, 272, 271; 327/554, 50, 327/52, 54, 56, 68, 89, 83
See application file for complete search history.

(56) References Cited

U.S. PATENT DOCUMENTS

| | | | | |
|---|---|---|---|---|
| 3,281,707 A | * | 10/1966 | Baracket | 330/117 |
| 3,763,437 A | * | 10/1973 | Seidel | 330/53 |
| 3,886,470 A | * | 5/1975 | O'Neil et al. | 330/149 |
| 3,939,437 A | * | 2/1976 | Adam | 330/84 |
| 3,980,826 A | * | 9/1976 | Widmer | 375/258 |
| 4,686,686 A | * | 8/1987 | Nakayama et al. | 375/229 |
| 5,440,256 A | * | 8/1995 | Erhart et al. | 327/94 |
| 5,493,246 A | * | 2/1996 | Anderson | 327/382 |
| 5,625,320 A | | 4/1997 | Hagerty | |
| 6,166,971 A | | 12/2000 | Tamura et al. | |
| 6,480,178 B1 | * | 11/2002 | Itakura et al. | 345/89 |
| 6,664,941 B2 | * | 12/2003 | Itakura et al. | 345/89 |
| 7,286,811 B2 | * | 10/2007 | Kral | 455/333 |
| 2006/0284678 A1 | * | 12/2006 | Dillon | 330/252 |

OTHER PUBLICATIONS

Dr. Howard Johnson; "Multi-Level Signaling—High-Performance Backplanes: Where Are They Headed?"; DesignCon 2000; Feb. 1, 2000; available from www.signalintegrity.com; pp. 1-15.
Alan Fiedler et al.; "A 1.0625Gbps Transceiver with 2x-Oversampling and Transmit Signal Pre-Emphasis"; ISSCC 1997; Paper FP 15.1; Feb. 1997.

* cited by examiner

*Primary Examiner*—David C. Payne
*Assistant Examiner*—Linda Wong
(74) *Attorney, Agent, or Firm*—Timothy W. Markison; Michael T. Wallace

(57) ABSTRACT

A system, device, and method for compensation of distortion caused by transmission line effects are disclosed herein. An output port including a feed-forward circuit parallel to the output impedance of an output driver compensates for distortion introduced by transmitting data over a transmission medium. The compensated output driver is utilized to transmit data between devices or circuits connected using conductive traces on printed circuit boards.

16 Claims, 8 Drawing Sheets

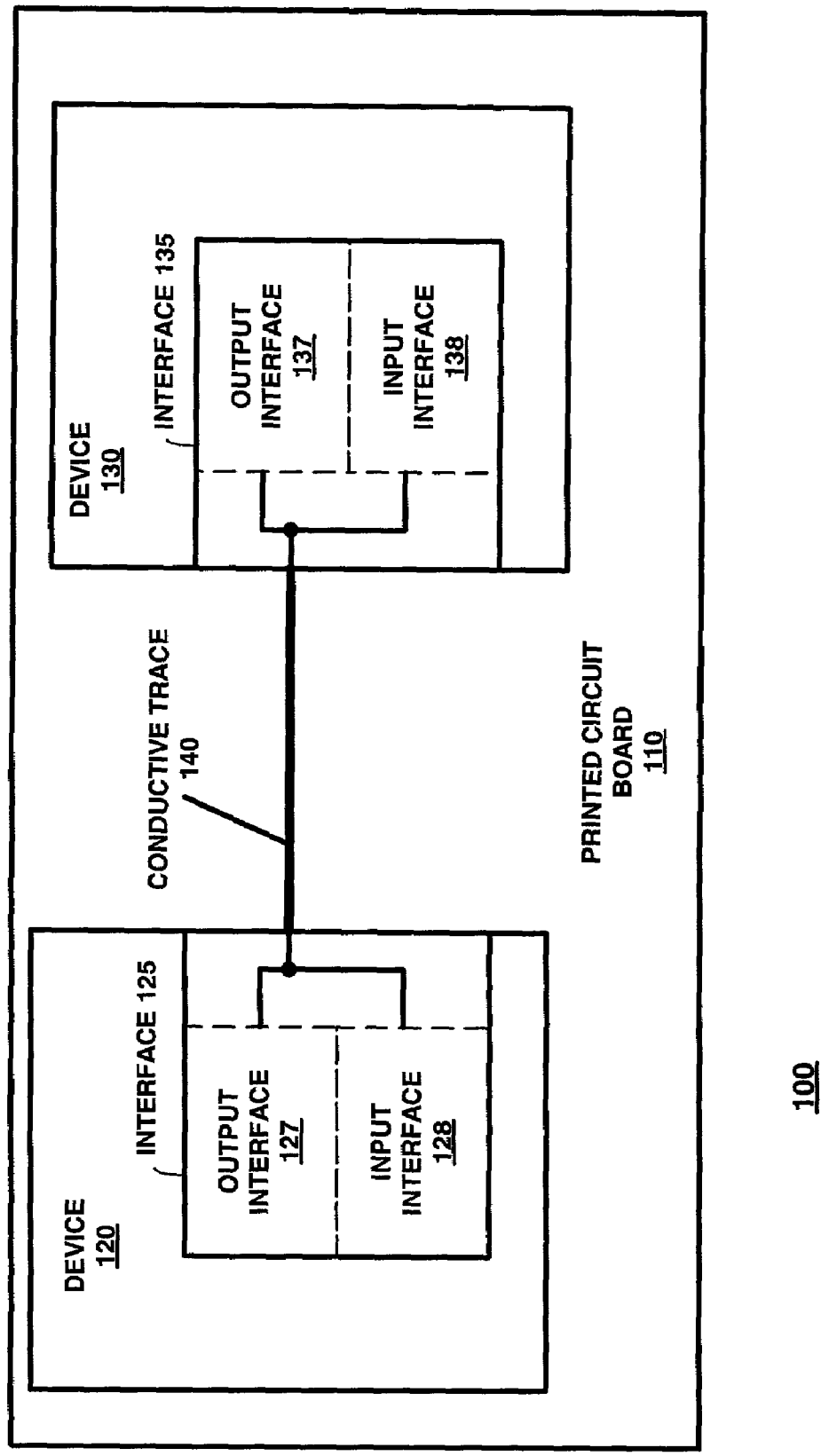

DEVICE AND METHOD FOR COMPENSATION OF TRANSMISSION LINE DISTORTION

FIELD OF THE DISCLOSURE

The present disclosure relates generally to transmission of data and more particularly to compensating for distortion of data transmitted over a transmission medium.

BACKGROUND

Signals transmitted at high frequency over conductive traces are subject to transmission characteristics of the transmission medium they traverse. For example, the transmission characteristics includes transmission line effects, frequency responses of connectors, etc. For example, printed circuit board traces do not transmit signals instantaneously from transmitting device to receiving device, but have an associated propagation time, for example, one to two nanoseconds of propagation time for a trace of 100 to 200 mm in length. In these circumstances, the transmitted signal when received at a receiving device can be distorted due to various transmission line effects. At high data transmission rates, such distortion can prevent transmitted signals from being properly interpreted by receiving devices. Such transmission line distortion can be manifested by frequency dependent roll-off, reflections, ringing, cross talk, and other types of signal distortion. FIG. 1 illustrates signal distortion as can occur with known output drivers.

In FIG. 1, an output driver 12 receives a data signal 10 having transitions between a high state and a low state. The output driver 12 generates output signal 14, which is a representation of the original data signal 10. Output signal 14 is transmitted over transmission medium 16 to a receiving device (not shown). However, due to transmission line effect distortion the output signal 14 is distorted, as represented by received signal 18, when it is received at the receiving device.

A number of methods have been developed to compensate for distortion caused during the transmission of a signal or minimize the distortion. One method used to reduce transmission line distortion is to improve the characteristics of the transmission medium that affect the transmission of signals. For example, FR-4 laminate material commonly used with printed circuit boards tends to negatively affect high frequency characteristics of transmitted signals, especially as the length of the conductive traces increase. For example, above a transmission frequency of 1 gigahertz the dielectric characteristics of normal FR-4 laminate in combination with the conductive trace result in significant signal distortion associated with transmission line effects. Accordingly, one method of improving the high-frequency characteristics of a system is to use printed circuit boards made of materials other than FR-4 that better isolate conductive traces, and therefore reduce distortion due to transmission line effects. However, such alternate PCBs are very expensive in comparison to FR4.

Another common method of compensating for signal distortion is to use a series connected pre-emphasis circuit within the transmitter and/or a series connected equalizer in the receiver. However, the use of pre-emphasis circuits and/or equalizers often increases the complexity of the system, making it more costly and/more difficult to implement. In addition, the pre-emphasis circuitry and equalizer increases the consumption of power.

Signals may still be detected in the presence of certain type of transmission related distortion using various methods of 'partial response detection'. These detectors attempt to resolve the most likely transmitted data based upon recently received data and characteristics of the transmission medium. A 'Viterbi' detector is a circuit of this type. These complex circuits are often quite costly, however, and can almost invariably benefit in performance from having reduced transmission related distortion. Hence, it is often the case that even systems employing a partial response circuit may employ other schemes to optimize the overall channel performance. It is apparent that an improved device and method for compensating and/or reducing the effects of signal distortion that overcome limitations of the known art would be advantageous.

BRIEF DESCRIPTION OF THE DRAWINGS

FIG. 3 is a block diagram illustrating a printed circuit board having devices that compensate for signal distortion in accordance with the present invention;

DETAILED DESCRIPTION OF THE FIGURES

In accordance with the present disclosure, a feed-forward compensated output driver is disclosed for transmitting data between connected devices or circuits using conductive traces of a printed circuit board and/or other electrical transmission mediums. Such devices or circuits include high-bandwidth data processors such as gateways, routers, protocol converters, switches, general purpose data processors, programmable logic devices, and/or field programmable gate arrays. In other cases these circuits may entail relatively simple parallel to/from serial converters that multiplex a large number of parallel data lines to a fewer number of high speed data lines that are to be sent across a PC board.

Figure 2:
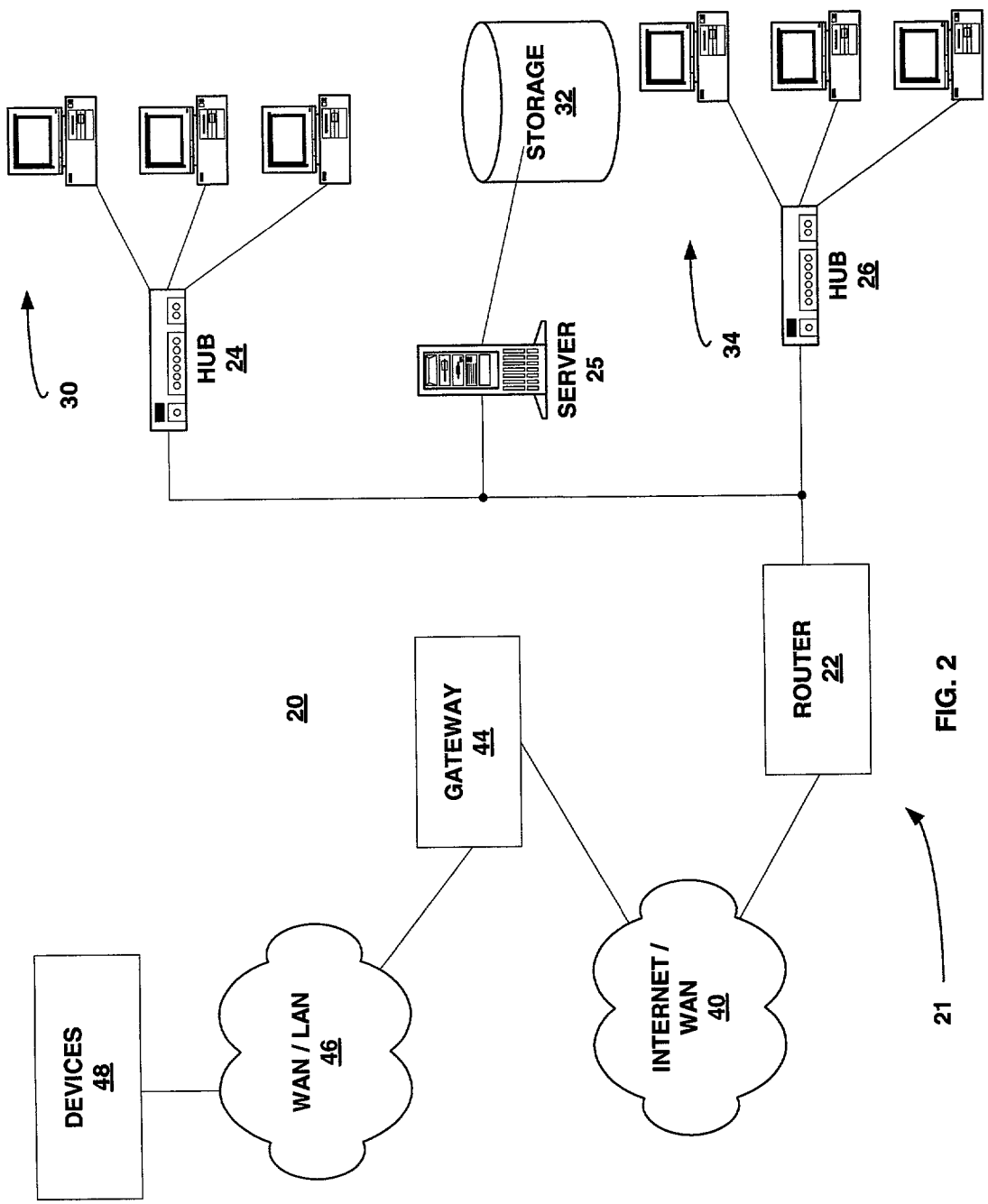
FIG. 2 is a block diagram of a network and devices using method and techniques in accordance with the present invention.

FIG. 2 illustrates a networked system 20. The networked system 20 illustrates multiple local and/or wide area networks coupled together through a wide area network 40, which can include the internet 40. A first local area network (LAN) 21 includes router 22, hub 24, server 25, and hub 26. The router 22 is coupled to the hub 24, server 25, and hub 26. Hubs 24 and 26 are each connected to a plurality of computing devices 30 and 34, while the server 25 is connected to a storage device 32. In addition, FIG. 2 illustrates a second network 46, which may be a LAN or a wide area network (WAN), coupled to the network 40 through a gateway 44 that generally performs protocol conversion on data transmitted between the Internet 40 and the network 46. The network 46 can communicate with one or more devices 48.

In order to support the data transfer rates of networks such as the ones illustrated in FIG. 2, the devices associated with the network need to process and transmit data internally at high rates. For example, the router 22, gateway 44, hubs 24 & 26, and server 25 may need to internally process data at rates that make the local transmission (intra-device transmission) of data susceptible to distortion by transmission line effects. By implementing specific techniques described herein, the amount of distortion associated with intra-device transmission of signals can be reduced. Specific embodiments of such techniques are further discussed with reference to FIGS. 3-15.

FIG. 3 illustrates a system or device 100 in accordance with a specific embodiment of the present disclosure. System 100 includes circuit components mounted on a printed circuit board or other interconnect medium (PCB) 110. Generally, system 100 would represent an electronic portion of one of the devices illustrated in FIG. 2. For example, the system 100 can be part of the router 22 of FIG. 2.

Devices 120 and 130 are mounted on PCB 110. A bi-directional conductive trace 140 connects devices 120 and 130 and thereby supports data transmission between the devices. The devices 120 and 130 represent any of a number of different types of processing devices. For example, the devices 120 and 130 can be one or more of application specific integrated circuits, field programmable gate arrays, memories, microprocessors, microcontrollers, logic circuits, analog circuits, and/or digital circuits. The devices 120 and 130 are illustrated to each have bi-directional interfaces 125 and 135, respectively, to accommodate both transmitting and receiving data. For example, in one embodiment, data transmitted by output interface 127 is received by input interface 138, while data transmitted by output interface 137 is received by input interface 128. In an alternate embodiment (not shown) one interface, such as interface 135, may be dedicated to receiving data via input interface 138 while the other interface, such as interface 125, is dedicated to transmitting data via output interface 127. For purposes of discussion herein, only the transmission of data from output interface 127 of interface 125 to input interface 138 of interface 135 will be discussed, though it will be appreciated that device 130 can potentially also transmit data to device 120.

Figure 1:
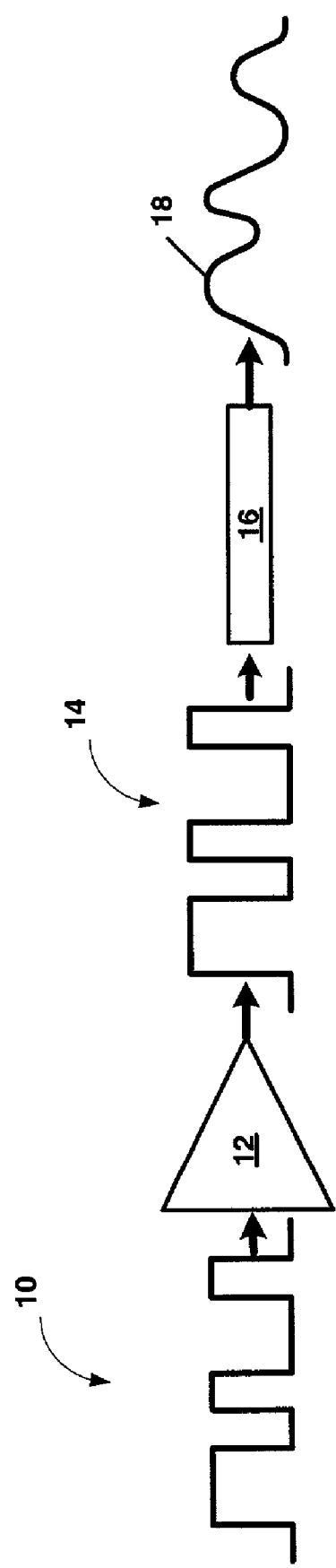
FIG. 1 is a prior art representation of a transmitted signal being distorted by transmission line effects.
Figure 4:
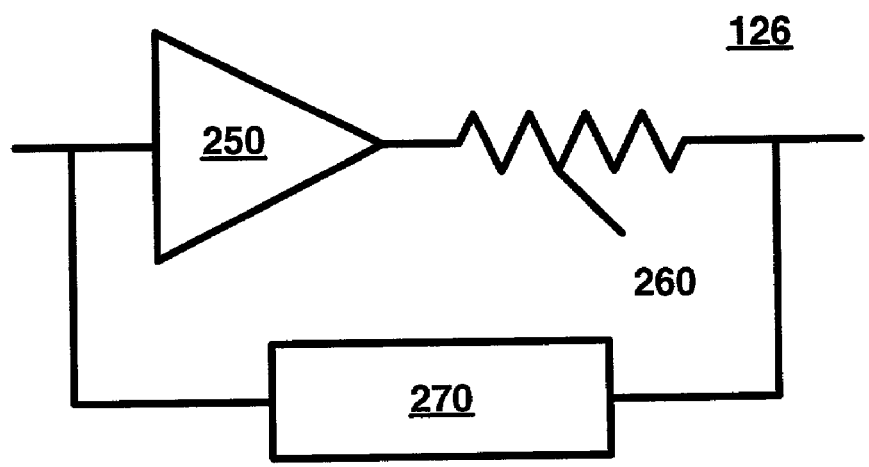
FIG. 4 is a block diagram illustrating a circuit representing a portion of FIG. 2 in accordance with the present invention.

FIG. 4 illustrates a block diagram of a drive circuit 126 that is part of the output interface 127 of FIG. 3. Specifically, the circuit of FIG. 4 includes a driver 250 in series with a resistor 260, and feed-forward circuit 270 in parallel with the driver 250 and resistor 260 combination. The driver 250 can be a variety of amplifiers, such as a non-inverting amplifier, voltage follower amplifier, difference amplifier, and the like. Note that the resistor 260 represents the impedance matching of the driver 250 to the line and may be implemented using internal impedance of the driver alone or in combination with an external resistor. The driver 250 provides a representation of a received data signal at its output. As described with reference to prior art FIG. 1, signals driven by driver 250 alone, or the driver 250 and resistor 260 combination, are subject to distortion during transmission. Feed-forward circuit 270 increases the transmitted signal power by adding additional signal to the output of driver 250, where the additional signal generated by feed-forward circuit 270 corresponds to data transitions. This is further illustrated with reference to FIG. 5.

Figure 5:
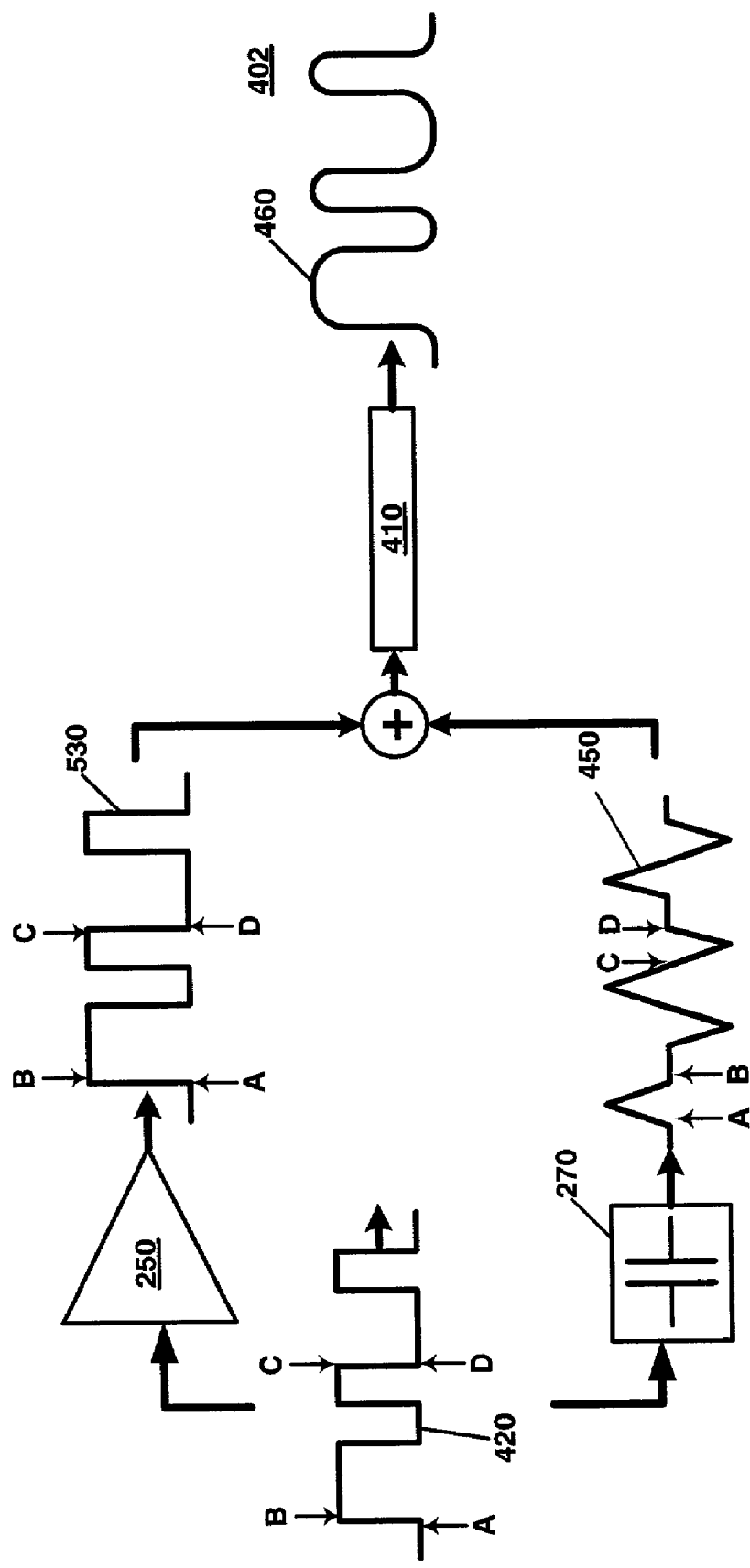
FIG. 5 is a block diagram illustrating another circuit representing a portion of FIG. 2 in accordance with the present invention.

FIG. 5 illustrates the effect of using the feed-forward circuit 270 in combination with the previously described driver 250. As illustrated, original data signal 420 is provided to the inputs of driver 250 and feed-forward circuit 270. As with the non-compensated driver path described in FIG. 1, driver 250 provides a signal 530 at its output that is representative of original data signal 420. The feed-forward circuit simultaneously generates a signal 450 that will compensate for anticipated transmission line distortion. The signal 450 generates an output signal that provides signal energy at each signal level transition of original data signal 420. For example, as original data signal 420 transitions from a "low" level at point A to a "high" level at point B, capacitive branch 270 generates a corresponding positive signal energy to compensate the rising edge generated by driver 250. Likewise, capacitive branch 270 can generate a signal having a corresponding negative signal energy between points C and D due to a rapid transition from a "high" to a "low" level of original data signal 420. By combining the signal energies from the feed-forward circuit 270 and the driver 250, a signal having an improved data transition rate is provided to transmission media 410, resulting in a signal 460 being received at a receiving device that more closely matches the transmitted signal.

Figure 6:
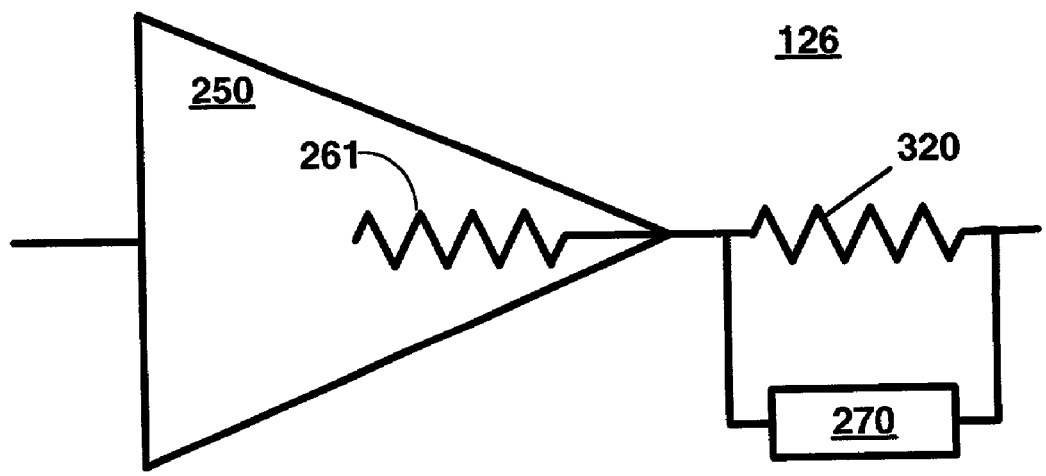
FIG. 6 is a block diagram illustrating a representation of a signal being transmitted in accordance with the present invention.

FIG. 6 illustrates another embodiment of a drive circuit 126, having a driver 250, that is part of the output interface 127 of FIG. 3. Driver 250 has an internal impedance 261, and is in series with a discrete resistor 320. A feed-forward circuit 270 is parallel with the just the discrete resistor 320. When the drive circuit 126 is part of the output interface 127 of FIG. 3, the driver 250 receives an input data stream 420 (illustrated in FIG. 5) and provides a representation of the received data at its output. The feed-forward circuit 270, which is coupled in parallel with the discrete resistor 320 receives the representation of the signal from the output of the driver 250 and provides a compensating energy in the manner previously described at its output. The resulting signal, provided by the drive circuit 126, compensates for anticipated transmission line effects.

Figure 7:
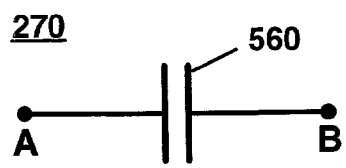
FIG. 7 is a block diagram representing a specific embodiment for a feed-forward circuit of FIGS. 4 and 5 in accordance with the present invention.

FIGS. 7-14 illustrate specific embodiments of feed-forward circuit 270. FIG. 7 illustrates a feed-forward circuit comprising a discrete capacitor 560. The capacitor 560 acts has a high-pass filter to pass signal energy associated with the high-frequency components of received data, such as are associated with rising and falling edges of received data.

Figure 8:
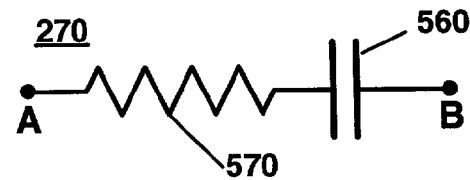
FIG. 8 is a block diagram representing a specific embodiment for a feed-forward circuit of FIGS. 4 and 5 in accordance with the present invention.

FIG. 8 illustrates a discrete capacitor 560 in series with a resistor 570. While the capacitor 560 acts as a high-pass filter to pass high-frequency components of received data, the resistor 570 acts to limit the amount of high frequency energy passed.

Figure 9:
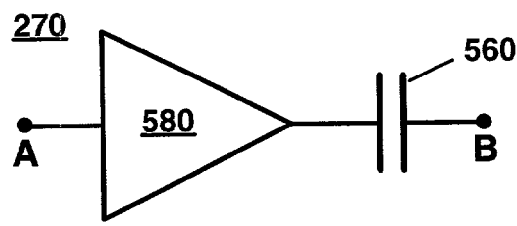
FIG. 9 is a block diagram representing a specific embodiment for a feed-forward circuit of FIGS. 4 and 5 in accordance with the present invention.

FIG. 9 illustrates feed-forward circuit 270 having an amplifier 580 in series with fixed capacitor 560. Amplifier 580 can include a variety of amplifier types, such as a non-inverting amplifier, voltage follower, difference amplifier, and the like.

Figure 10:
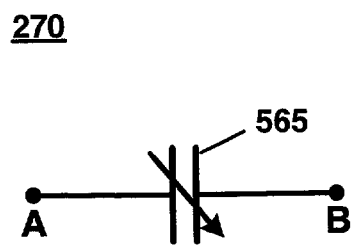
FIG. 10 is a block diagram representing a specific embodiment for a feed-forward circuit of FIGS. 4 and 5 in accordance with the present invention.

FIG. 10 illustrates a feed-forward circuit 270 comprising a variable capacitor 565. In one embodiment, the variable capacitor is manually adjusted by a technician. In an alternate embodiment, the variable capacitor can be automatically adjusted based on a received or specified value, or based on the results of a training method, as will be discussed in greater detail herein.

Figure 11:
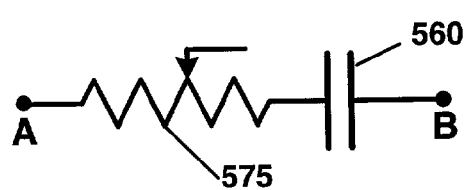
FIG. 11 is a block diagram representing a specific embodiment for a feed-forward circuit of FIGS. 4 and 5 in accordance with the present invention.

FIG. 11 illustrates a feed-forward circuit 270 comprising a variable resistor 575 in series with a capacitor 560. In one embodiment, the variable resistor is manually adjusted by a technician. In an alternate embodiment, the variable resistor can be automatically adjusted based on a received or specified value, or based on the results of a training method, as will be discussed in greater detail herein.

Figure 12:
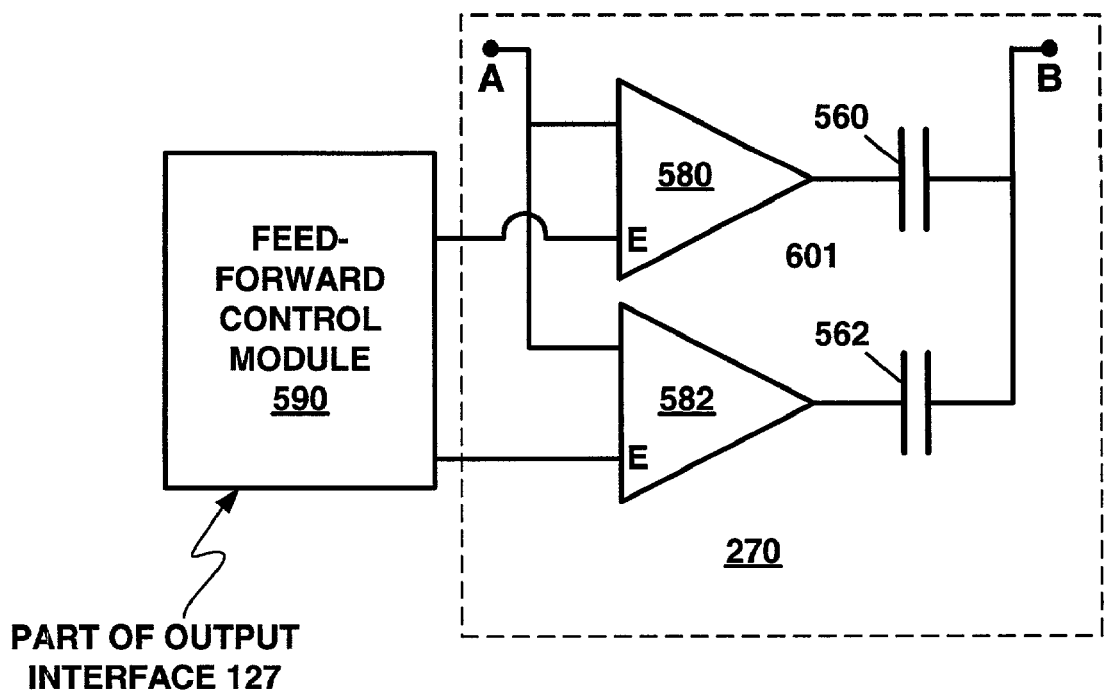
FIG. 12 is a block diagram illustrating specific embodiment implementing an adjustable feed-forward circuit in accordance with the present invention.

FIG. 12 illustrates a specific embodiment of a feed-forward circuit 270 and a feed-forward control module 590. In operation, the feed-forward control module 590 interfaces with the feed-forward circuit 270 to control a specific property that affects the output of the circuit of FIG. 12. The specific property can include one or both of a resistance value and a capacitance value. For purposes of discussion, it is assumed that the feed-forward control module 590 controls a capacitance value. The feed-forward circuit 270 comprising multiple amplifier-capacitor pairs, of the type illustrated in FIG. 9, coupled together in parallel is illustrated in FIG. 12. The amplifiers 580 and 582 are individually enabled to provide signal energy to the output node B of feed-forward circuit 270. The amplifiers 580 and 582 can be selected individually or simultaneously to achieve a desired amount of signal energy to compensate for anticipated signal distortion.

Feed-forward control module 590 can be part of the output interface 127 (FIG. 1) and is coupled to the amplifiers of the feed-forward circuit 270 in FIG. 12. In one embodiment, the feed-forward control module 590 can include manual switches, such as DIP switches, that are manually selected by a user. Based on the settings of the manual switches, appropriate signal levels for enabling or disabling operation of the amplifiers 580 and 582 are provided to the circuit 270 during operation. In another embodiment, the feed-forward control module 590 reads a value stored at a specific location (not illustrated) and enables the amplifiers 580 and 582 based upon the stored value. The stored value can be provided by a user, or by a training module, which can be implemented as part of the capacitive adaptation module. The use of a training module with this type of transmission of signals is known in industry. Generally, training involves applying one or more signals over a transmission media to empirically determine characteristics of the media or their effects on received signals. For example, a simple test can involve sending one or more pulses to a receiver to determine if the receiver responds in a known manner based upon the received pulses. By modifying a characteristic of the sent pulse(s) and monitoring when the receiving system does not respond correctly, assumptions can be made about the distortion occurring to signals transmitted over the transmission media. Depending upon the quality of the transmission media, as determined during training, the feed-forward control module can select appropriate components of circuit 270 to compensate for anticipated distortion based on the training results. In another embodiment, a training module can monitor the data being received at module 270 and adjust the feed-forward circuit based upon characteristics of this data, such as its data transmission rate.

Figure 13:
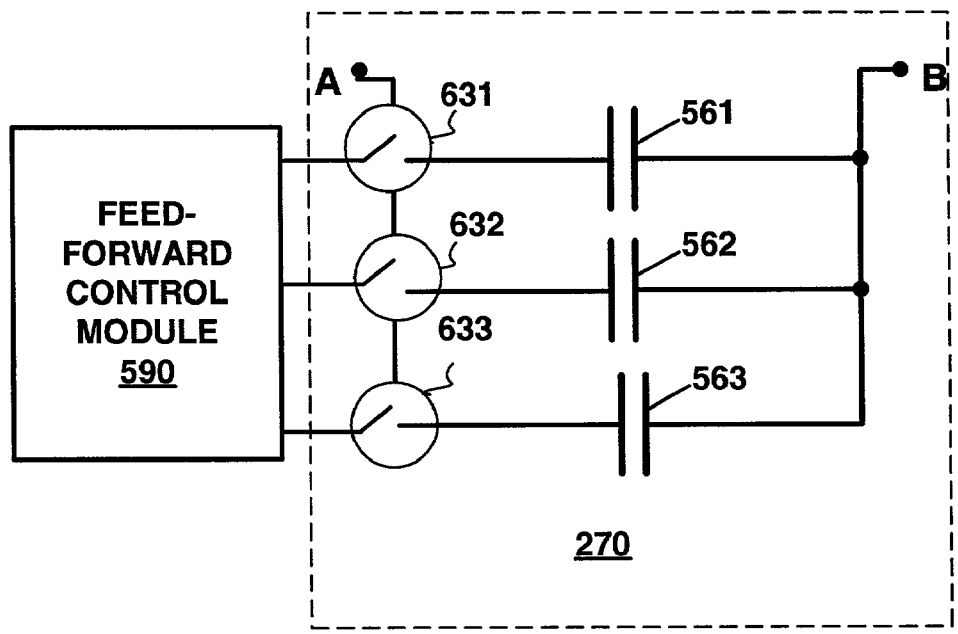
FIG. 13 is a block diagram illustrating specific embodiment implementing an adjustable feed-forward circuit in accordance with the present invention.

FIG. 13 illustrates another embodiment of a feed-forward circuit 270. Specifically, circuit 270 of FIG. 13 comprises a plurality of switched capacitors coupled in parallel, whereby each switched capacitor is illustrated as one of switches 631-633 in series with one of capacitors 561-563. The feed-forward control module 590 is analogous to the feed-forward control module 590 described with reference to FIG. 12. The capacitance associated with feed-forward circuit 270 can be selected by enabling one or more of the switched capacitors.

Figure 14:
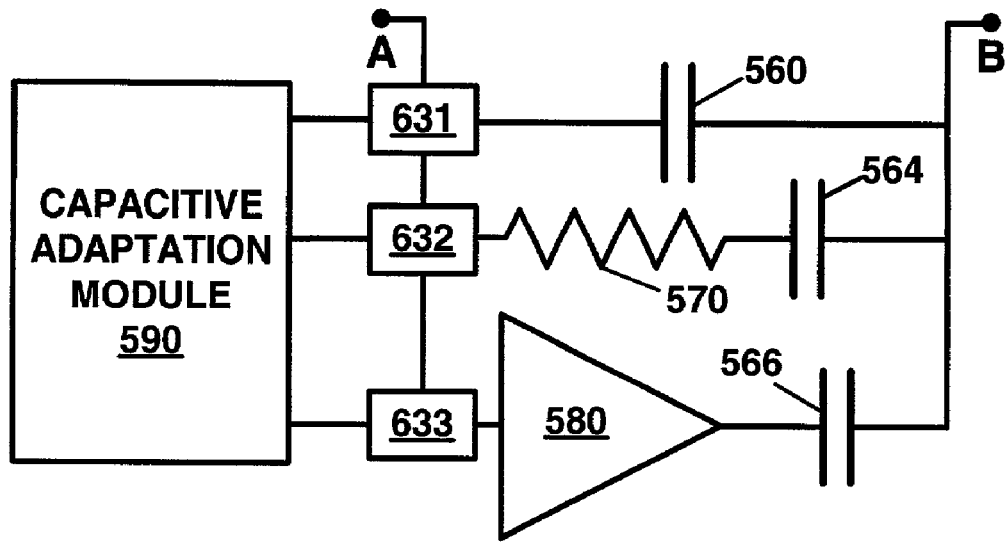
FIG. 14 is a block diagram illustrating specific embodiment implementing an adjustable feed-forward circuit in accordance with the present invention.

FIG. 14, illustrates another embodiment of a feed-forward circuit 270. The circuit 270 of FIG. 14 comprises a plurality of parallel circuit branches. A first circuit branch includes a switched capacitor that includes a switch 631 and capacitor 560. A second circuit branch includes a resistor 570 in series with capacitor 564 that is controlled by switch 632. The third circuit branch illustrated includes an amplifier 580 in series with capacitor 566 controlled by switch 633. The feed-forward control module 590 is analogous to the feed-forward control module 590 described with reference to FIG. 12, where the capacitance associated with feed-forward circuit 270 can be selected by enabling one or more switched capacitors. As a result, the amount of additional signal provided to compensate for distortion can be controlled by enabling one or more circuit branches of FIG. 14.

Figure 15:
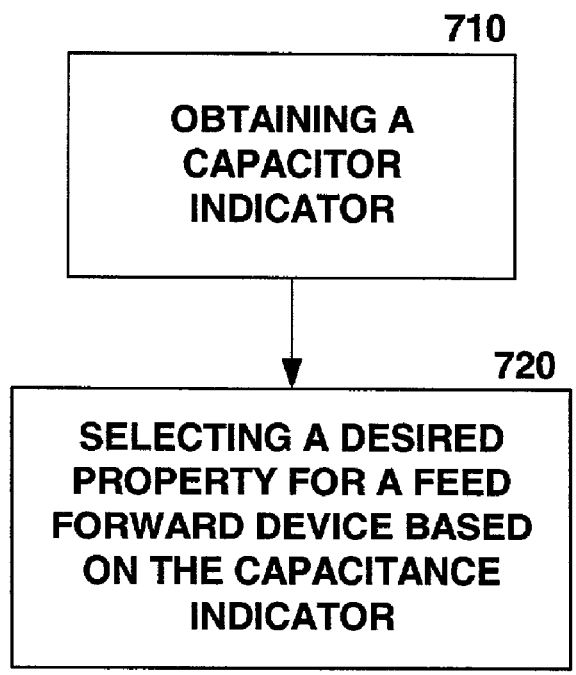
FIG. 15 illustrates a flow diagram representing a method in accordance with a specific embodiment of the present invention.

FIG. 15 illustrates a method in accordance with a specific embodiment of the invention. At step 710, a capacitance indicator is obtained. The capacitance indicator can be manually provided by a user, for example through the use of DIP switches, programmed by a user as a value stored in memory or a register, or determined based upon operating conditions of a system. For example, the capacitance indicator can be determined based upon a data transmission rate of transmitted data, or by empirically determining specific characteristics of a transmission media, or levels of signal distortion, that relate to a specific transport medium by monitoring a transmitted signal. Based upon this information a table or equation can be used to determine the specific capacitance indicator used to control the signal provided by a feed-forward circuit. In other embodiments, the capacitor value would be adjusted 'on the fly', in order to properly compensate for changes in the transmission medium or the data destination address.

At step 720, a capacitance for a feed-forward circuit is selected based upon the capacitance indicator obtained at step 710. Generally, the capacitance is selected by enabling and/or disabling switches. Where the value obtained in step 710 is set using DIP switches, the step 720 occurs inherently during operation. Where the value obtained in step 720 is stored at a specific memory map location, electronically controlled switches are enabled or disable based upon the obtained value.

In specific embodiments, functions and components of the present application may be implemented using an information handling machine such as a data processor, or a plurality of processing devices. Such a data processor may be a microprocessor, microcontroller, microcomputer, digital signal processor, state machine, logic circuitry, and/or any device that manipulates digital information based on operational instruction, or in a predefined manner. Generally, the various functions, and systems represented by block diagrams are readily implemented by one of ordinary skill in the art using one or more of the implementation techniques listed herein. When a data processor for issuing instructions is used, the instruction may be stored in memory. Such a memory may be a single memory device or a plurality of memory devices. Such a memory device may be read-only memory device, random access memory device, magnetic tape memory, floppy disk memory, hard drive memory, external tape, and/or any device that stores digital information. Note that when the data processor implements one or more of its functions via a state machine or logic circuitry, the memory storing the corresponding instructions may be embedded within the circuitry that includes a state machine and/or logic circuitry, or it may be unnecessary because the function is performed using combinational logic. Such an information handling machine may be a system, or part of a system, such as a computer, a personal digital assistant (PDA), a hand held computing device, a cable set-top box, an Internet capable device, such as a cellular phone, and the like.

The preceding detailed description of the figures, reference has been made to the accompanying drawings which form a part thereof, and to which show by way of illustration specific embodiments in which the invention may be practiced. It will be appreciated that many other varied embodiments that incorporate the teachings herein may be easily constructed by those skilled in the art. For example, while the FIG. 3 illustrates a trace coupling two devices together it will be appreciated that multiple devices can be coupled together using multiple traces that are electrically coupled. Accordingly, the present disclosure is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present disclosure is defined only by the appended claims.

What is claimed is:

1. An output interface comprising:
an amplifier having an output impedance and an input continuously coupled to receive an input signal, wherein the amplifier sources a transmission line;
a feed-forward circuit in parallel with the amplifier, wherein the feed-forward circuit compensates for transmission characteristics of the transmission line;
a feed-forward control module coupled to the feed-forward circuit to adaptively alter a property of the feed-forward circuit in response to at least one characteristic of the transmission line; and
wherein the feed-forward circuit further comprises a plurality of switched capacitors in parallel with each other, wherein each one of the switched capacitors includes a capacitor in series with a switch and at least one of the plurality of switched capacitors is selectable based on a desired capacitance value to be placed in parallel with the output impedance.

2. The output interface as in claim 1, wherein a capacitance value of a capacitor of said plurality of switched capacitors is determined at least in part by a data transition rate.

3. The output interface as in claim 1, wherein a capacitance value of a capacitor of said plurality of switched capacitors is determined based at least in part on a characteristic of said transmission line to which said output interface is electrically coupled.

4. The output interface as in claim 1, wherein said feed-forward circuit further comprises an amplifier in series with a capacitor.

5. The output interface as in claim 1, wherein said feed-forward circuit further comprises a resistive element in series with a capacitor.

6. The output interface as in claim 1, wherein the property is one of a capacitance value and a resistance value.

7. A device comprising:
a data processing module having an output;
an amplifier having an input continuously coupled to the output of the data processing module, and an output;
a feed-forward circuit having an input coupled to the output of the data processing module and an output coupled to the output of the amplifier;
a feed-forward control module coupled to the feed-forward circuit to adaptively select a capacitance value of the feed-forward circuit based on at least one characteristic of a transmission medium to which the device is electrically coupled; and
wherein said feed-forward circuit further comprises a plurality of switched capacitors in parallel with each other, wherein each one of the switched capacitors includes a capacitor in series with a switch and at least one switched capacitor of the plurality of switched capacitors is selectable based on a desired capacitance value to be placed in parallel with said amplifier.

8. The device as in claim 7, wherein a capacitance value of a capacitor of said plurality of switched capacitors is determined at least in part by a data transition rate.

9. The device as in claim 7, wherein a capacitance value of a capacitor of said plurality of switched capacitors is determined based at least in part on a characteristic of a transmission medium to which said output interface is electrically coupled.

10. The device as in claim 7, wherein said feed-forward circuit further comprises an amplifier in series with a capacitor of said plurality of switched capacitors.

11. The device as in claim 7, wherein said feed-forward circuit further comprises a resistive element in series with a capacitor of said plurality of switched capacitors.

12. A device comprising:
a printed circuit board;
a first device having an input;
a second device having an output:
an amplifier having an input and an output, wherein the input of the amplifier is continuously coupled to an output of the second device and the output of the amplifier is coupled to the input of the first device via the printed circuit board;
a feed-forward circuit in parallel with the amplifier;
a feed-forward control module coupled to the feed-forward circuit to adaptively select a capacitance value of the feed-forward circuit in response to at least one characteristic of the printed circuit board to which the first device is electrically coupled; and
wherein the feed-forward circuit comprises a plurality of switched capacitors in parallel with each other, wherein each one of the switched capacitors includes a capacitor in series with a switch and at least one switched capacitor of the plurality of switched capacitors is selectable based on a desired capacitance value to be placed in parallel with an output impedance of the amplifier.

13. The device as in claim 12, wherein a capacitance value of a switched capacitor of the plurality of switched capacitors is determined at least in part by a data transition rate.

14. The device as in claim 12, wherein a capacitance value of a switched capacitor of the plurality of switched capacitors is determined based at least in part on a characteristic of the printed circuit board to which the first device is electrically coupled.

15. The device as in claim 12, wherein said feed-forward circuit further comprises an amplifier in series with a capacitor.

16. The device as in claim 12, wherein said feed-forward circuit further comprises a resistive element in series with a capacitor.

* * * * *